(12) United States Patent  
Li et al.

(10) Patent No.: US 9,258,377 B2  
(45) Date of Patent: Feb. 9, 2016

(54) PUBLISH INFORMATION ON WEBSITE

(71) Applicant: Alibaba Group Holding Limited, Grand Cayman (KY)

(72) Inventors: Ning Li, Hangzhou (CN); Rongjie Chen, Hangzhou (CN); Tengfei Fang, Hangzhou (CN); Yangfan Yu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 253 days.

(21) Appl. No.: 13/957,293

(22) Filed: Aug. 1, 2013

(65) Prior Publication Data

US 2014/0040390 A1   Feb. 6, 2014

(30) Foreign Application Priority Data

Aug. 2, 2012   (CN) .......................... 2012 1 0274377

(51) Int. Cl.
| | |
|---|---|
| *H04L 29/08* | (2006.01) |
| *G06F 17/30* | (2006.01) |
| *H04L 12/58* | (2006.01) |
| *H04L 29/12* | (2006.01) |

(52) U.S. Cl.
CPC ............ *H04L 67/26* (2013.01); *G06F 17/3089* (2013.01); *H04L 51/32* (2013.01); *H04L 67/02* (2013.01); *H04L 61/1564* (2013.01); *H04L 61/307* (2013.01); *H04L 61/3015* (2013.01)

(58) Field of Classification Search
CPC ..... H04L 67/26; H04L 51/32; H04L 61/1564; H04L 61/3015; H04L 61/307; H04L 67/02; G06F 17/3089

USPC .................. 709/206, 217, 226, 229  
See application file for complete search history.

(56) References Cited

U.S. PATENT DOCUMENTS

| | | | |
|---|---|---|---|
| 6,146,026 | A | 11/2000 | Ushiku |
| 6,480,885 | B1 | 11/2002 | Olivier |
| 2003/0115116 | A1 | 6/2003 | Crampton |
| 2005/0033597 | A1 | 2/2005 | Fenton-Jones |
| 2006/0050012 | A1 | 3/2006 | Eller et al. |
| 2006/0089944 | A1 | 4/2006 | Dandekar et al. |
| 2008/0005284 | A1 | 1/2008 | Ungar et al. |
| 2008/0022013 | A1 | 1/2008 | Adelman et al. |

(Continued)

FOREIGN PATENT DOCUMENTS

| | | | | |
|---|---|---|---|---|
| WO | WO2006038036 | | 4/2006 | |
| WO | WO 2006038036 | * | 4/2006 | .............. H04L 12/58 |

OTHER PUBLICATIONS

PCT Search Report and Written Opinion mailed Apr. 21, 2014 for PCT Application No. PCT/US13/53300, 7 Pages.

*Primary Examiner* — Kim T Nguyen  
(74) *Attorney, Agent, or Firm* — Lee & Hayes, PLLC

(57) ABSTRACT

The present disclosure provides an example method, device, and system for publishing information to various websites. Publishing Information is collected from a corresponding registration server based on registration information. The publishing information includes the receiving terminal registration information. The publishing information is sent to a corresponding website according to the receiving terminal registration information. The receiving terminal registration information corresponds to a server domain address of the corresponding website. The present techniques reduce redundant posting steps at the websites and improve the efficiency of posting.

20 Claims, 4 Drawing Sheets

(56) References Cited

U.S. PATENT DOCUMENTS

| | | |
|---|---|---|
| 2008/0221979 A1 | 9/2008 | Engel |
| 2008/0228777 A1 | 9/2008 | Sawant |
| 2009/0248623 A1 | 10/2009 | Adelman et al. |
| 2011/0004692 A1 | 1/2011 | Occhino et al. |
| 2011/0066521 A1 | 3/2011 | Rowe et al. |
| 2011/0145424 A1 | 6/2011 | Sattari et al. |
| 2011/0196935 A1* | 8/2011 | Rideout et al. ............ 709/206 |
| 2011/0219087 A1 | 9/2011 | Jorasch et al. |
| 2012/0072550 A1 | 3/2012 | Anufrieva |
| 2013/0212172 A1 | 8/2013 | Fisher et al. |
| 2013/0238971 A1 | 9/2013 | Zheng et al. |

* cited by examiner

PUBLISH INFORMATION ON WEBSITE

CROSS REFERENCE TO RELATED PATENT APPLICATIONS

This application claims foreign priority to Chinese Patent Application No. 201210274377.7 filed on 2 Aug. 2012, entitled "Method, Apparatus, and System for Publishing Information at Website," which is hereby incorporated by reference in its entirety.

TECHNICAL FIELD

The present disclosure relates to the field of Internet communication, and more specifically, to a method, an apparatus, and a system for publishing information on websites.

BACKGROUND

In conventional techniques, when users publish articles or various types of information on websites, they all need to use user names and passwords that have already been registered to log into a website and then complete words or attachment documents at a location provided by the website to complete the functions of publishing articles or information at the website. For example, if a user desires to perform publishing operations, such as posting an article or a message or replying to a message on a blog or microblog, etc. the user needs to first log into the website of such blog or microblog. After the user who is logging in has been authenticated as a legitimate user, the user opens the publishing window on the blog or microblog to input an article, a message or send an attachment, thereby completing the functions to send a post by publishing an article and commenting on the article on the website.

The conventional techniques of publishing posts on the website have the following disadvantages. If the user desires to publish the same information on a plurality of websites, the user needs to log into various websites one by one and then complete the forms for publishing one by one, which inevitably increases the workload of the user and reduces the efficiency of publishing information. In addition, during the process of publishing information one by one on various websites, if an article has been written in Word™ application and there is a desire to publish such an article to a website, a layout of the article needs to be redone according to the requirements of various websites. If the article contains pictures, then such pictures need to be inserted into the article before it can be published, which even further reduces the efficiency of publishing the post.

No effective solution has been proposed to resolve the problem of excessive and inefficient process of publishing posts at the websites.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The conventional techniques do not resolve the problem of excessive and inefficient process of publishing posts at the websites. The present disclosure provides a method, apparatus and system for publishing information at websites.

The present disclosure provides an example method for publishing information at websites. Publishing information is collected from a corresponding registration server based on registration information. The publishing information includes receiving terminal registration information. The publishing information is sent to a corresponding website according to the receiving terminal registration information. The receiving terminal registration information corresponds to a server domain address of the corresponding website.

For example, the registration information may include the e-mail address information of registered e-mail addresses. The publishing information may be collected from the corresponding registration server based on the registration information. The publishing information may include the receiving terminal registration information. The operations for publishing information to the corresponding website based on the receiving terminal registration information may include the following. An e-mail is downloaded from a corresponding e-mail server based on information of the registered e-mail address in order to obtain e-mail information of the e-mail at the registered e-mail addresses. The e-mail information may include e-mail abstract information. A user name of an e-mail address of a recipient may be extracted from the e-mail abstract information. The e-mail information is pushed to a corresponding website based on the user name of the e-mail address of the recipient. The user name of the e-mail address of the recipient corresponds to the server domain name address of the website corresponding to such registered e-mail address.

Further, the e-mail information may also include an e-mail body text and an e-mail attachment. After e-mail information of all e-mails at the registered e-mail address is obtained, the example method may further include the following. A unique identification (ID) of each e-mail is obtained. A relationship between the ID and the e-mail information corresponding to such ID is created to obtain a relationship table. Example operations for creating the relationship between the ID and the e-mail address to obtain the relationship table may include the following. A relationship between the ID and the e-mail abstract information corresponding to such ID is created in order to obtain a first relationship table. In addition or alternatively, a relationship between the ID and the e-mail body text and the e-mail attachment in the e-mail information is created in order to obtain a second relationship table.

Further, the e-mail abstract information may include an e-mail title, an e-mail address of a sender, the e-mail address of the recipient, and a sending time. Example operations for pushing the e-mail information to the website corresponding to the registered e-mail address based on the user name of the e-mail address of the recipients may include the following. The e-mail abstract information in the first relationship table is read. The website to be accessed is determined based on the user name of the e-mail addresses of the recipient in the e-mail abstract information. The user name corresponds to the server domain name address of the website. It is determined whether properties of the e-mail abstract information in the first relationship table match properties of a first data processing interface provided by the website. If there is a match, the e-mail abstract information of the e-mail information is sent to the website through the first data processing interface. When the e-mail abstract information of the e-mail information is sent successfully, the ID corresponding to such e-mail abstract information returned by the website is received. If there is no match, the pushing of the e-mail abstract information of the e-mail information is terminated.

Further, before pushing the e-mail abstract information of the e-mail information to the websites through the first data processing interface, the example method may include the following. Registered user information table of the website is inquired to determine whether the registered user corresponding to the e-mail address of the recipient in the e-mail information exists. When the inquiry is successful, the e-mail abstract information of the e-mail information is permitted for pushing. When the inquiry fails, the pushing of the e-mail abstract information of the e-mail information is terminated.

Further, after receiving the ID corresponding to such e-mail abstract information that has been returned by the website, the example method may include the following. Based on the returned ID, the e-mail body text and the e-mail attachment corresponding to such ID is read from the second relationship table. It is determined whether properties of the e-mail body text and the e-mail attachment in the second relationship table match properties of the second data processing interface provided by the website. If there is match, the e-mail body text and the e-mail attachment corresponding to the ID are sent to the websites through the second data processing interface. If there is no match, there is a failure to send the e-mail body text and the e-mail attachment and an error message is returned.

Further, after creating the relationship between the ID and the e-mail information corresponding to such ID in order to obtain the relationship table, the example method may include the following. The relationship table is saved to one or more server. The one or more servers may include a database server and/or a file server. A triggering message is sent to a pushing server. The pushing server reads the relationship table saved on the servers based on the received triggering message.

Further, the ID may include any one of or a combination of any two or more of multiple parameters according to one or more preset rules. The parameters may include a serial number of a client device, an e-mail time, and a random serial number.

The present disclosure also provides an example system for publishing information at websites. The example system may include a collecting server and a pushing server. The collecting server collects publishing information from a corresponding registration server based on registration information. The publishing information may include registration information of a receiving client. The pushing server sends the publishing information to a corresponding website according to the receiving terminal registration information. The receiving terminal registration information corresponds to a server domain address of the corresponding website.

Further, the registration information may include the e-mail address information of the registered e-mail address. The collecting server may download an e-mail from a corresponding e-mail server based on information of the registered e-mail address in order to obtain e-mail information of the e-mail at the registered e-mail address. The e-mail information may include e-mail abstract information. The pushing server obtains a user name of an e-mail address of a recipient from the e-mail abstract information and pushes the e-mail information to a corresponding website based on the user name of the e-mail address of the recipient. The user name of the e-mail address of the recipient corresponds to the server domain name address of the website corresponding to the registered e-mail address.

Further, the e-mail information may also include an e-mail body text and an e-mail attachment. The collecting server obtains a unique ID of each e-mail. The example system may also include a database server that establishes a communication connection with the collecting server. After the collecting server creates a relationship between the ID and the e-mail abstract information corresponding to such ID, the database server stores a first relationship table obtained by the collecting server. The example system may also include a file server that establishes a communication connection with the collecting server. After the collecting server creates a relationship between the ID and the e-mail body text and the e-mail attachment in the e-mail information, the file server stores a second relationship table obtained by the collecting server.

Further, the e-mail abstract information may include an e-mail title, an e-mail address of a sender, the e-mail address of the recipient, and a sending time. The pushing server may include a first reading apparatus, a processing apparatus, and a first determining apparatus. The first reading apparatus establishes a communication with the database server and reads the e-mail abstract information in the first relationship table from the database server. The processing apparatus determines the website to be accessed based on the user name of the e-mail addresses of the recipient in the e-mail abstract information. The user name corresponds to the server domain name address of the website. The first determining apparatus determines whether properties of the e-mail abstract information in the first relationship table match properties of a first data processing interface provided by the website. If there is a match, the e-mail abstract information of the e-mail information is sent to the website through the first data processing interface. When the e-mail abstract information of the e-mail information is sent successfully, the ID corresponding to such e-mail abstract information returned by the website is received. If there is no match, the pushing of the e-mail abstract information of the e-mail information is terminated.

Further, the pushing server may include a receiving apparatus, a second reading apparatus, and a second determining apparatus. The receiving apparatus receives the ID returned by the website. The second reading apparatus, based on the returned ID, reads the e-mail body text and the e-mail attachment corresponding to such ID from the second relationship table. The second determining apparatus determines whether properties of the e-mail body text and the e-mail attachment in the second relationship table match properties of the second data processing interface provided by the website. If there is a match, the e-mail body text and the e-mail attachment corresponding to the ID are sent to the websites through the second data processing interface. If there is no match, there is a failure to send the e-mail body text and the e-mail attachment and an error message is returned.

The present disclosure also provides an example device for publishing information at websites. The example device may include a downloading module and a publishing module. The downloading module collects publishing information from a corresponding registration server based on registration information. The publishing information may include registration information of a receiving client. The publishing module establishes a communication with the downloading module and sends the publishing information to a corresponding website according to the receiving terminal registration information. The receiving terminal registration information corresponds to a server domain address of the corresponding website.

Further, the registration information may include the e-mail address information of the registered e-mail address. The downloading module may download an e-mail from a corresponding e-mail server based on information of the registered e-mail address in order to obtain e-mail information of the e-mail at the registered e-mail address. The e-mail information may include e-mail abstract information. The publishing module may include a first obtaining module and a pushing module. The first obtaining module establishes a communication with the downloading module and obtains a user name of an e-mail address of a recipient from the e-mail abstract information. The pushing module establishes a communication with the first obtaining module and pushes the e-mail information to a corresponding website based on the user name of the e-mail address of the recipient. The user name of the e-mail address of the recipient corresponds to the server domain name address of the website corresponding to the registered e-mail address.

Further, the e-mail information may also include an e-mail body text and an e-mail attachment. The example device may further include a second obtaining module, a first creating module, and/or a second creating module. The second obtaining module obtains a unique ID of each e-mail. The ID may include any one of or a combination of any two or more of multiple parameters according to one or more preset rules. The parameters may include a serial number of a client device, an e-mail time, and a random serial number. The first creating module establishes a communication with the second obtaining module to create a relationship between the ID and the e-mail abstract information corresponding to such ID to obtain a first relationship table. The second creating module establishes a communication with the second obtaining module to create a relationship between the ID and the e-mail body text and the e-mail attachment in the e-mail information to obtain a second relationship table.

Further, the e-mail abstract information may include an e-mail title, an e-mail address of a sender, the e-mail address of the recipient, and a sending time. The pushing module may include a first reading module, a verifying module, and a first determining module. The first reading module reads the e-mail abstract information in the first relationship table. The verifying module determines the website to be accessed based on the user name of the e-mail addresses of the recipient in the e-mail abstract information. The user name corresponds to the server domain name address of the website. The first determining module determines whether properties of the e-mail abstract information in the first relationship table match properties of a first data processing interface provided by the website. If there is a match, the e-mail abstract information of the e-mail information is sent to the website through the first data processing interface. When the e-mail abstract information of the e-mail information is sent successfully, the ID corresponding to such e-mail abstract information returned by the website is received. If there is no match, the pushing of the e-mail abstract information of the e-mail information is terminated.

Further, the pushing module may include a second reading module and a second determining module. The second reading module, based on the returned ID, reads the e-mail body text and the e-mail attachment corresponding to such ID from the second relationship table. The second determining module determines whether properties of the e-mail body text and the e-mail attachment in the second relationship table match properties of the second data processing interface provided by the website. If there is a match, the e-mail body text and the e-mail attachment corresponding to the ID are sent to the websites through the second data processing interface. If there is no match, there is a failure to send the e-mail body text and the e-mail attachment and an error message is returned.

The present techniques collect the publishing information from the corresponding registration server based on the registration information. The publishing information includes the receiving terminal registration information. The present techniques push the publishing information to the corresponding website based on the receiving terminal registration information. The receiving terminal registration information corresponds to the server domain name address of the corresponding website.

The present techniques provide methods for publishing information to websites without logging into the websites. The user may only need to download the publishing information from the registration server through the collecting server and have the pushing server determine target websites to publish the information by reading the registration information, thereby directly pushing the publishing information to the websites that correspond to the server domain name address that correspond to the receiving terminal registration information and completing publishing information. The present techniques do not require the user to separately logging into the websites to complete the process of sending information. The present techniques help resolve the problems of excessive and inefficient process of publishing information on the websites under the conventional techniques, thereby reducing steps for publishing information at websites. In addition, there may be a plurality of registration servers and thus a plurality of publishing information may be downloaded to publish at a plurality of websites. The present techniques reduce redundant steps and improve the efficiency of publishing information.

BRIEF DESCRIPTION OF THE DRAWINGS

To better illustrate embodiments of the present disclosure, the following is a brief introduction of the FIGs to be used in the description of the embodiments. It is apparent that the following FIGs only relate to some embodiments of the present disclosure. A person of ordinary skill in the art can obtain other FIGs according to the FIGs in the present disclosure without creative efforts. The example embodiments and their specifications are used to illustrate the present disclosure and shall not constitute inappropriate restrictions to the present disclosure.

DETAILED DESCRIPTION

Unless there is a conflict, the embodiments in the present disclosure and the characteristics of the embodiments can be combined together or referenced to each other. The following is description of the present disclosure by reference to the FIGs.

Figure 1:
FIG. 1 is a structural diagram of an example system for publishing information to websites in accordance with an example embodiment of the present disclosure.
Figure 2:
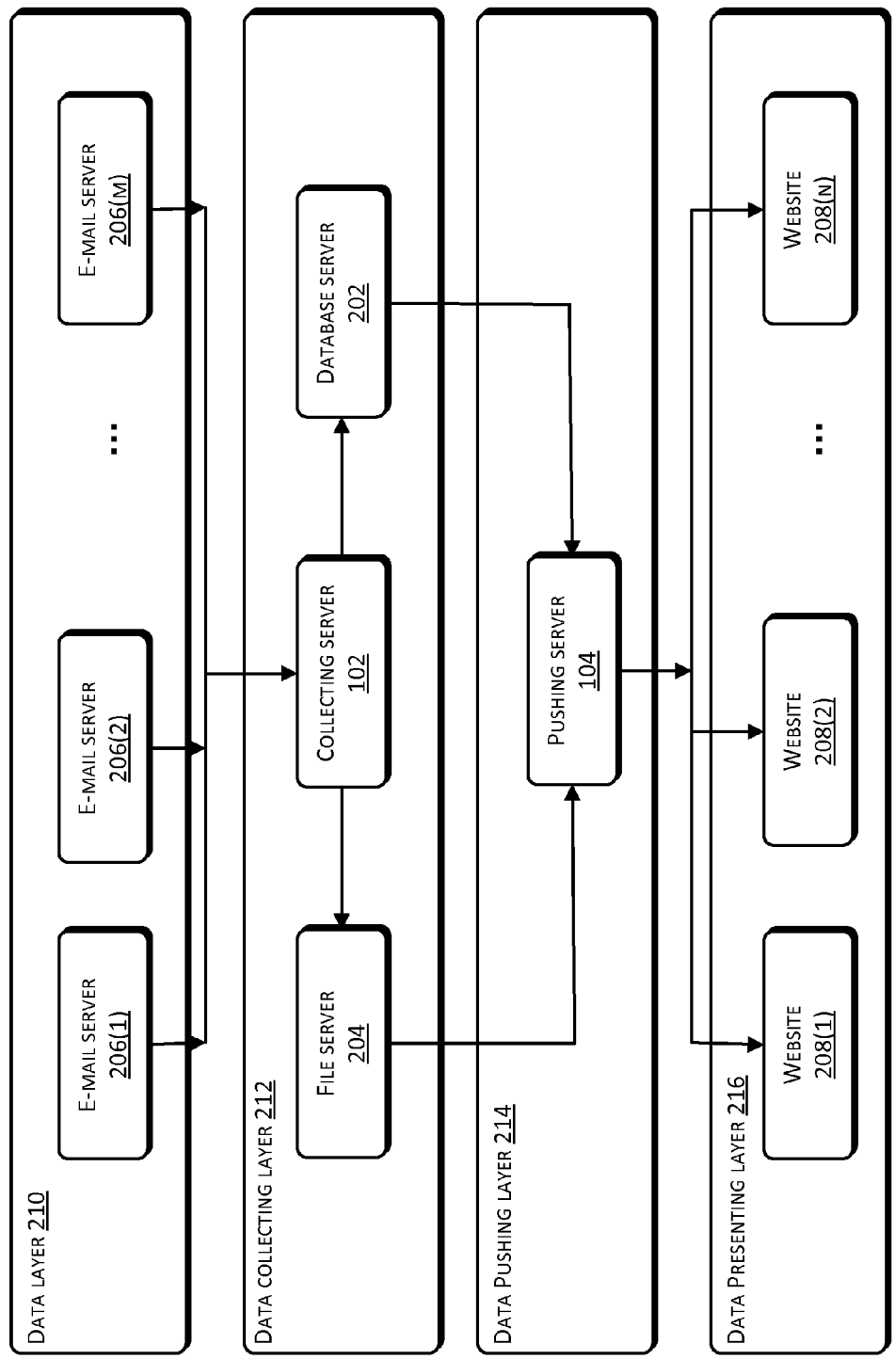
FIG. 2 is a detailed structural diagram of the example system for publishing information to the websites in accordance with the example embodiment of the present disclosure.

FIG. 1 is a structural diagram of an example system for publishing information to websites in accordance with an example embodiment of the present disclosure. FIG. 2 is a detailed structural diagram of the example system for publishing information to the websites based on the example embodiment as shown in FIG. 1.

As shown in FIG. 1, the example system for publishing information to websites includes a collecting server 102 and a pushing server 104.

The collecting server 102 in the system is used to collect publishing information from the corresponding registration server. The publishing information includes the receiving terminal registration information. The pushing server 104 is used to push the publishing information to one or more corresponding websites 106 based on the receiving terminal registration information, wherein the receiving terminal registration information corresponds to the server domain name address of the corresponding websites. The fact that the above the receiving terminal registration information corresponds to the server domain name address of the corresponding websites refers to the fact that based on the receiving terminal registration information, it is possible to acquire the domain name addresses of the target website server to which the information needs to be sent. Therefore, the receiving terminal registration information may include the server domain name address of the corresponding website and may also set up a corresponding relationship through a mapping.

The solution of the above example embodiments of the present disclosure provides a way to distribute information to websites without logging into the websites. The user only needs to download the publishing information from a registration server through a collecting server and then have a pushing server determine the target websites that distribute the information by reading the registration information, thereby making it possible to push publishing information directly to the website that correspond to the server domain name address of the receiving client and completing publishing of messages. The user does not need to separately log into each website to complete the process of publishing information. This resolves the issues of the highly excessive and inefficient process of publishing information at websites provided by the relevant existing technology. The present techniques achieve a reduction of the steps for publishing information at websites. Also, due to the fact that there may be a plurality of registration servers, a plurality of publishing messages may be downloaded. That is, it is possible to send information to a plurality of websites, thereby achieving a reduction of redundant steps for publishing information and an improvement of the efficiency of publishing information.

Specifically, the registration server in the above example embodiments of the present disclosure can be an e-mail server, an instant communication tool or application server, and a cell phone text message server, etc., or any other server that exchanges information through a network.

For example, when the registration server is an instant communications application server, an account number of a registered user for a current user may be used as the registration information. The user uses the instant communication tool on the client to distribute messages to one or a plurality of users (log-in account numbers or user names). All messages will be saved on the instant communication tool server. Based on the log-in account number or user name of the registered user, the collecting server will download the message sent by the registered user from the instant communication tool server. The message includes the log-in account number that uses the instant communication tool to distribute a message, the log-in account number of the message recipient and contents of the message. Then, the pushing server will distribute the message to the target websites based on the user information of another or a plurality of users (the log-in account numbers or user names of the message recipients). At this time, the login account numbers or user names of the message recipients correspond to the server domain name address of the target websites.

When the registration server is a cell phone text message server, the cell phone number registered by the current user may be used as the registration information. When the current user uses a cell phone to send a message to the cell phones of another user or a plurality of users, all messages will be saved on the cell phone text message server. The collecting server will download all the messages sent by the current cell phone user from the cell phone text message server based on the cell phone number of the current user. Such messages include the cell phone number of the message sender (the user that uses the registered cell phone number to send the message), the cell phone numbers of the message recipients as well as the contents of the message. Then, the pushing server will distribute the information to the target websites based on the cell phone numbers of another or the plurality of users (the cell phone numbers of the message recipients). At this time, the cell phone numbers of the message recipients correspond to the server domain names of the target websites.

More specifically, the present disclosure may describe the technical solution in detail by using the example that the registration server is the e-mail server. That is, when the registration information is the e-mail information of registered e-mail addresses, the collecting server in the system of the above example embodiments of the present disclosure is used to download e-mails from the corresponding e-mail address server based on the e-mail address information of the registered e-mail addresses in order to obtain the e-mail information at the registered e-mail addresses. The e-mail information may include e-mail abstract information, which is used to obtain the user names of the e-mail addresses of recipients in the e-mail abstract information and push e-mail information to the corresponding websites based on the user names of the e-mail addresses of the recipients. The user names of the e-mail addresses of the recipients correspond to the server domain name addresses of the websites corresponding to such registered e-mail addresses. In the above example embodiment, prior to the collecting server's downloading the e-mails, the user first logs into the registered e-mail address and enters a name that corresponds to the server domain name of the target website as the user name of the e-mail address of the recipient and launches the e-mail transmission after entering the e-mail addresses of the recipients and publishing the message.

The solution in the above example embodiments of the present disclosure provides a way to send information to websites by e-mail. The user only needs to download an e-mail from a registered e-mail address through the collecting server and then extracts the website address of the target website from the e-mail information of the e-mail downloaded through the pushing server, thereby sending contents of the information to the target website. The contents of the information are distributed to the websites corresponding to such registered e-mail addresses in the form of e-mail messages. The above method to send information does not require the user to log into a website. Instead, it pushes contents of the information to the target websites in the form of the e-mail messages and the user may send the e-mail at the same time to the e-mail addresses of a plurality of recipients based on his need and the e-mail addresses of each of the recipients corresponding to a target website. The present techniques achieve operations of sending information to a plurality of websites, thereby achieving operations of sending information at the same time to a plurality of websites and resolving the issue of the highly excessive and inefficient process used by the conventional techniques for publishing information to websites. Further, the present techniques achieve a reduction of the steps for publishing information on websites and improve the efficiency of publishing information.

For another example, the pushing server in the above example embodiment may be combined with the above collecting server. Alternatively, the pushing server may be separate from the collecting server to improve the productivity of the collecting server. In addition, prior to the collecting server's downloading e-mails, the user desiring to distribute information can log into the registered e-mail address to send e-mails. The user names of the e-mail addresses of the recipients correspond to the server domain name addresses of the target websites. After the pushing server downloads the e-mails at the registered e-mail addresses, it will successfully publish information at the target websites.

The purpose of the above example embodiment of the present disclosure is to provide users with another way to publish information to the target websites. This method of publishing information does not require users to log into websites one by one and allows them to directly publish information and reply to posts at websites by only sending e-mails to the e-mail addresses of various recipients. The specific achievement process is completed by the collecting server and the pushing server. In addition, publishing information through e-mails supports duplicating and saves the format and graphics of the original articles without requiring users to make adjustments to the format of each website, thereby further improving the efficiency of publishing information.

In the above example embodiments of the present disclosure, an e-mail address needs to be registered at the collecting server firstly. After completion of the configuration of the e-mail information for the registered e-mail address on the collecting server, all of the e-mails in the registered e-mail address are downloaded from the corresponding e-mail server. Specifically, during an example process of the present disclosure, the e-mail address registered at the collecting server can be the e-mail address of the sender or the e-mail address of the recipient. If the registered e-mail address is the e-mail address of the sender, the collecting server will, based on the e-mail information of the e-mail address of the sender that has been locally configured, obtain all the e-mails and e-mail information from the outbox of the e-mail address of the sender. The e-mail information may include the e-mail abstract information. The e-mail abstract information records the e-mail addresses of the recipients of all e-mails. At this time, the pushing server will push the e-mail information based on the user names of the e-mail addresses of the recipients. The user names of the e-mail addresses of such recipients correspond to the server domain name addresses of the target websites to which the e-mail information needs to be pushed.

Similarly, if the registered e-mail addresses are the e-mail addresses of the recipients, then the collecting server will, based on the e-mail address information of the e-mail addresses of such recipients that has been locally configured, obtain all e-mails and e-mail information from the inboxes of the e-mail addresses of the recipients. E-mail information may include the e-mail abstract information. The e-mail abstract information records the e-mail addresses of the recipients of all e-mails. At this time, the pushing server will, based on the user names of the e-mail addresses of the recipients, push the e-mail information. The user names of the e-mail addresses of such recipients correspond to the server domain name addresses of the target websites to which the e-mail information needs to be pushed. In the above two examples, there may be a plurality of e-mail addresses of recipients.

For example, using the example that the registered e-mail address is the e-mail address of the sender, the collecting server configures the e-mail address information of the e-mail address of the sender in the format defined by Table 1 as shown below. The collecting server will log into the e-mail address of the sender based on the configured e-mail address information and download all of the e-mails and e-mail information in the sent box, which includes all sent e-mails, of the e-mail address of the sender. During the example process, the collecting server will use the defined user name and password of the e-mail address of the sender (such as fatie@XXX.com) to log into the e-mail server and then at preset intervals (such as 5 minutes) inquire and download all of the e-mails at the registered e-mail address from the e-mail server.

TABLE 1

| Field name | Description | Type |
| --- | --- | --- |
| ID | Primary key | Varchar (32) |
| Email | E-mail address | Varchar (100) |
| Email_User_Name | User name of the e-mail address | Varchar (50) |
| Email_Password | E-mail address password | Varchar (20) |
| Email_Type | E-mail address type | Varchar (10) |

The collecting server may define forwarding rules based on Table 2 as below. Table 2 defines the relationship between e-mail addresses and the websites corresponding to such e-mail addresses. That is, the e-mail address represents the target website to which information is published. Again, using the example that the registered e-mail address is the e-mail address of the sender, the user may at the same time send an e-mail to the e-mail addresses of one or a plurality of recipients through the e-mail address of the sender. For example, sending an e-mail to a@XXX.com from the registered e-mail address may represent that the user needs to send a post at website a according to the relationship table in Table 2. Since the user can at the same time send an e-mail to the e-mail addresses of a plurality of recipients through the e-mail address of one sender, the e-mail address of the sender has a many-to-many corresponding relationships with the target websites to which the information needs to be posted. The e-mail address of one recipient corresponds to the address of one target website.

TABLE 2

| Field name | Description | Type | Remarks |
| --- | --- | --- | --- |
| Email | E-mail address | Varchar (100) | Example: a@XXX.com |
| WebSite | Corresponding website | Varchar (200) | Example: http://www.a.com |

After the collecting server downloads the e-mails periodically or in real time through configuring the e-mail address information of the registered e-mail addresses, it may save the e-mail information of all e-mails locally on the collecting server. The pushing server obtains e-mail information from the collecting server and, based on the mapping rules between the e-mail addresses of the recipients in the e-mail information and the websites, pushes the e-mail information to the corresponding target websites. Alternatively, the e-mail information may also be categorized and saved on other servers. The pushing server reads the e-mail information from the other servers and pushes the e-mail information to the corresponding websites based on the mapping rules between the e-mail addresses of the recipients in the e-mail information and the websites.

For example, as shown in FIG. 2, the e-mail information may also include e-mail body text and e-mail attachments. The collecting server 102 in the above example embodiment of the present disclosure obtains the unique ID of each e-mail, wherein the ID may be a 32-bit unique ID and may include any one of or a combination of any two or more of the following parameters according to one or more preset rules. The parameters may include a machine serial number of the collecting server 102, an e-mail time, and a random serial number. The machine serial number may be a MAC address, IP addresses, and any other hardware serial number of the collecting server 102. The e-mail time may be a storing time that the collecting server 102 stores the downloaded e-mail. The random serial numbers may be a self-increasing serial number, a self-decreasing serial number, or a regular data sequence generated according to one or more algorithms. The above system may also comprise a database server 202, which sets up communications in connection to the collecting server 102. After the collecting server 102 creates a relationship between the ID and the e-mail abstract information corresponding to such ID on the collecting server 102, the database server 202 saves the first relationship table obtained by the collecting server 102. The system may also include a file server 204, which sets up communications and connection to the collecting server 102. After the collecting server 102 creates a relationship between the ID and the e-mail body text and the e-mail attachment in the e-mail information on the collecting server 102, the file server 204 saves the second relationship table obtained by the collecting server 102.

For example, after the collecting server 102 configures the e-mail address information of the registered e-mail address to download the e-mails periodically or in real time, it may categorize the e-mail information of all e-mails. After the collecting server 102 creates the corresponding relationship between the ID and the e-mail abstract information in the e-mail information, it saves the above information and the first relationship table composed by the corresponding relationships between them to the database server 202. As shown in Table 3, the e-mail abstract information saved on the database server 202 may include the e-mail title, the e-mail addresses of the sender, the e-mail address of the recipient, and the sending time. The ID may be used as the unique identification of the e-mail to establish the corresponding relationship with the e-mail abstract information.

TABLE 3

| Field Name | Description | Type | |
|---|---|---|---|
| Email_ID | Primary key | Varchar (32) | |
| Sender | Name of sender | Varchar (30) | |
| Email_subject | Subject | Varchar (200) | |
| Send_Email | E-mail address of sender | Varchar (100) | |
| Receive_Email | E-mail address of recipients | Varchar (100) | |
| Email_body | Body text of the article (HTML format) | Clob/text | |
| Send_Time | Sending time | datatime | |
| Has_ATT | Whether there is any attachment | char | Y represents yes and N represents no |

At the same time, after the collecting server 102 creates the corresponding relationship between the ID and the e-mail body text and the e-mail attachment in the e-mail information, it saves the above information and the second relationship table composed of the corresponding relationships between them to the file server 204. For example, the e-mail body text and e-mail attachments of each e-mail may be saved on the file server 204 in the form of a folder. The folder may be named after the ID of each e-mail. Thus, the corresponding relationship between the ID and the e-mail body text and the e-mail attachment in the e-mail information is obtained and saved on the file server 204.

For example, in the example embodiments as shown in FIG. 1 and FIG. 2 of the present disclosure, after the collecting server 102 successfully logs in by using the user name and password of the registered e-mail address and inquires and downloads all of the e-mails of such registered e-mail address, it will generates the unique ID for each e-mail. After separately saving the ID and the corresponding e-mail abstract information on the database server 202 and saving the e-mail body text and the e-mail attachment in the folder named after or corresponding to such an ID on the file server 204, the collecting server 102 will send a triggering message to the pushing server 104 and notify the pushing server 104 to visit the database server 202 and the file server 204 to obtain e-mail information.

In the above example embodiments of the present disclosure, the pushing server 104 may include a first reading apparatus, a processing apparatus, and a first determining apparatus. The first reading apparatus establishes a communication with the database server and reads the e-mail abstract information in the first relationship table from the database server. The processing apparatus determines the website to be accessed based on the user name of the e-mail addresses of the recipient in the e-mail abstract information. The user name corresponds to the server domain name address of the website. The first determining apparatus determines whether properties of the e-mail abstract information in the first relationship table match properties of a first data processing interface provided by the website. If there is a match, the e-mail abstract information of the e-mail information is sent to the website through the first data processing interface. When the e-mail abstract information of the e-mail information is sent successfully, the ID corresponding to such e-mail abstract information returned by the website is received. If there is no match, the pushing of the e-mail abstract information of the e-mail information is terminated.

For example, before sending the e-mail abstract information in the e-mail information to the website through the first data processing interface, the pushing server 104 may inquire in the registered user information table of the website to determine whether the registered user corresponding to the e-mail address of the recipient in the e-mail information exist. When the inquiry is successful, the pushing server 104 permits to push the e-mail abstract information of the e-mail information. When the inquiry is unsuccessful, the pushing server 104 terminates pushing the e-mail abstract information of the e-mail information.

Further, the pushing server may include a receiving apparatus, a second reading apparatus, and a second determining apparatus. The receiving apparatus receive the ID returned by the website. The second reading apparatus, based on the returned ID, reads the e-mail body text and the e-mail attachment corresponding to such ID from the second relationship table. The second determining apparatus determines whether properties of the e-mail body text and the e-mail attachment in the second relationship table match properties of the second data processing interface provided by the website. If there is match, the e-mail body text and the e-mail attachment corresponding to the ID are sent to the websites through the second data processing interface. If there is no match, there is a failure to send the e-mail body text and the e-mail attachment and an error message is returned.

In the above example embodiment, after the pushing server 104 receives the triggering message, it inquires and obtains the data to be pushed from the database server 202 and the file server 204. That is, the e-mail abstract information, the e-mail body text (which may be in HTML format), and the e-mail attachment are pushed to the websites through the interface provided by the websites.

For example, in the above example embodiment, the first data processing interface provided by the websites is an interface for publishing information that is used to push the e-mail abstract information. The definition of such an interface is shown as in Table 4 below:

TABLE 4

| Property or Attribute | Type | Remarks |
| --- | --- | --- |
| E-mail address of the sender | Character string | The e-mail address of the sender is an e-mail address that corresponds to a registered user of the website. Otherwise, it will not be possible to publish information and reply to a post. A website inquires whether there is a registered user corresponding to such e-mail address. If yes, this registered user is used to send information. Otherwise, no operation will be performed |
| Name of the sender | Character string | Through the e-mail address of the sender, the user name of the registered user is inquired and obtained through the website |
| Article header | Character string | The e-mail title |
| Article type | Character string | If the e-mail title indicates the type of article, then this type is used directly. Otherwise, one or more keywords in the e-mail title are analyzed to map to the type of article based on the keywords. The mapping rules are provided by the website. |
| Article body text (HTML format) | Character string | |
| Publication time | Date and time | |
| Type of post | Number | 1 represents making a post and 2 represents replying a post. |
| Whether there is any attachments | Number | 0 represents no attachment and 1 represents there exists attachment |

Again, using the example of the registered e-mail address as the e-mail address of the sender, after the pushing server 104 receives a message to trigger sending a post, firstly the already saved e-mail abstract information is read from the database server 202. Then, according to the preset rules, the corresponding target website is obtained through inquiring based on the user name of the e-mail address of the recipient in the current e-mail abstract information. At this time, various attributes in the e-mail abstract information are matched with the article publication interface used by the target websites for pushing e-mail abstract information. In case there is a successful match, it is further determined whether the e-mail address of the sender carried in such e-mail abstract information has already been registered on the target website. That is, the website makes an inquiry whether the current website has recorded the registered user corresponding to such e-mail address. If there is already a registration, then the login information of the registered user corresponding to the e-mail address of such sender is obtained and such registration information of the registered user is used to perform follow-up operations for sending post. That is, the registered user is used to make post by using the e-mail information sent by the pushing server 104. Otherwise, no operations are performed.

If the posting is successful, the target website will return the ID of the article through the first data processing interface. That is, it returns the ID corresponding to the e-mail abstract information so that the corresponding e-mail body text and the e-mail attachment can be downloaded. It is only an example that the e-mail address of the sender must be an e-mail address of the registered user at the corresponding website. One of ordinary skill in the art may understand that there just needs a corresponding relationship between the e-mail address of the sender and the e-mail address of the registered user at the corresponding website.

For example, the user may need to achieve the function of updating the post. That is, a publisher (or the sender) and a subject of the article have been saved on the website is to be detected. If the same sender and subject are detected, the website will verify last published content according to the publication time and update the content.

The user may need to achieve the function of replying to a post. Based on the need, the subject name of the e-mail is set. For example, the subject name may be set as "Reply: XXX" or "Re: XXX", which indicates a post replying the article represented by XXX. The website may locate the post through the publisher and subject of the article.

After the e-mail abstract information is successfully published on the target website, that is, after information including the e-mail title, e-mail address of the sender, e-mail address of the recipient and the sending time, etc., is published on the website based on the need of the user, the pushing server 104 will, based on the ID corresponding to the e-mail abstract information returned by the website, decide to send the e-mail body text and/or the e-mail attachments corresponding to the e-mail abstract information.

For example, based on the second data processing interface provided by the websites, the pushing server 104 pushes the e-mail body text and/or the e-mail attachment corresponding to the e-mail abstract information. The second data processing interface provided by the websites is an attachment transmission interface for pushing the e-mail body text and/or the e-mail attachment. If the transmission is successful, the interface returns a true message. If the transmission fails, it returns an error message. The definitions of such interface are shown in Table 5 below.

TABLE 5

| Property or Attribute | Type | Remarks |
| --- | --- | --- |
| Article ID | Character string | The UUID indicating the article is provided by the website |
| Name of attachment | Character string | Such as a.jpg |
| Format of attachment | Character string | Such as jpg, doc, pdf, gif, mmp |
| Contents of attachment | Binary | |

Again, using the example that the registered e-mail address is the e-mail address of the sender, after the pushing server 104 receives the message to trigger the sending the post, it successfully sends e-mail abstract information and obtains the returned ID. The various properties in the e-mail abstract information are matched with the attachment transmission interface that is used for sending e-mail body text and/or the e-mail attachments and is provided by the target. In case there is a successful match, the pushing server 104 reads the e-mail body text and the attachment corresponding to such ID from the file server 204 and pushes them to the target website through the second data processing interface.

During the process by the target website to display articles in the posts and reply posts, as the article pushed to the website may be in the HTML format, the website may display the article directly through IFrame or other alternatives to embed the HTML web page to display the article. The attachment follows the article to be downloaded by users.

For example, if the e-mail body text collected by the collecting server 102 from one or more e-mail servers 206(1), 206(2), ..., 206(m) contains pictures, where m may be any integer, the pushing server 104 will firstly modify the path format of the picture in the e-mail body text. For instance, an absolute path of the website may be used as the basis for such modification in order to obtain the new path format of such picture. For example, a path format of a picture "User.jpg" is changed to http://blog.alibaba.com/12593121212/user.ipg, wherein http://blog.alibaba.com/ may be the absolute address of the target website and the number "12593121212" may be the unique ID number of the e-mail body text. Then, the new path format of the picture is used to identify the picture. Finally, the newly identified picture is pushed as an e-mail attachment. That is, the e-mail attachment pushed by the pushing server 104 includes the picture within the e-mail body text and the conventional attachment. At the same time, after the pushing server 104 pushes the e-mail attachment to one or more websites 208 (1), 208(2), ..., 208(n), where n may be any integer, such websites will verify conventional attachment in the e-mail attachment as well as the picture in the e-mail body text.

In the above example embodiment of the present disclosure, even if the website server crashes, an article can still be published (that is, sending or replying to a post). This is mainly because the example apparatus will save the e-mail information sent by the user to the database server 202 and/or the file server 204. This, even if the website server that publishes the article temporarily crashes, the article will still be saved at the database server 202 and/or the file server 204 of the example apparatus. After the pushing server 104 monitors that the website server has been restored, it will push the article to the website.

In the above example embodiment of the present disclosure, the collecting serve 102 is permitted to configure the many-to-many relationships between the e-mail addresses of the recipients and the websites. After the user sends the e-mail to the e-mail address of the recipient configured for a plurality of websites, the pushing server 104 may push the e-mail to a plurality of websites. That is, the article is published to a plurality of websites at the same time.

As shown in FIG. 2, there may be four layers in implementing the present techniques, which are a data layer 210, a data collecting layer 212, a data pushing layer 214, and a data presenting layer 216. There may be one or more e-mail servers 206(1), 206(2), ..., 206(m) where m may be any integer at the data layer 210. The data collecting layer 212 may include the file server 204, the collecting server 102, and the database server 202. The data pushing layer 214 may include the pushing server 104. The data presenting layer 216 may include one or more websites 208(1), 208(2), ..., 208(n), where n may be any integer.

Figure 3:
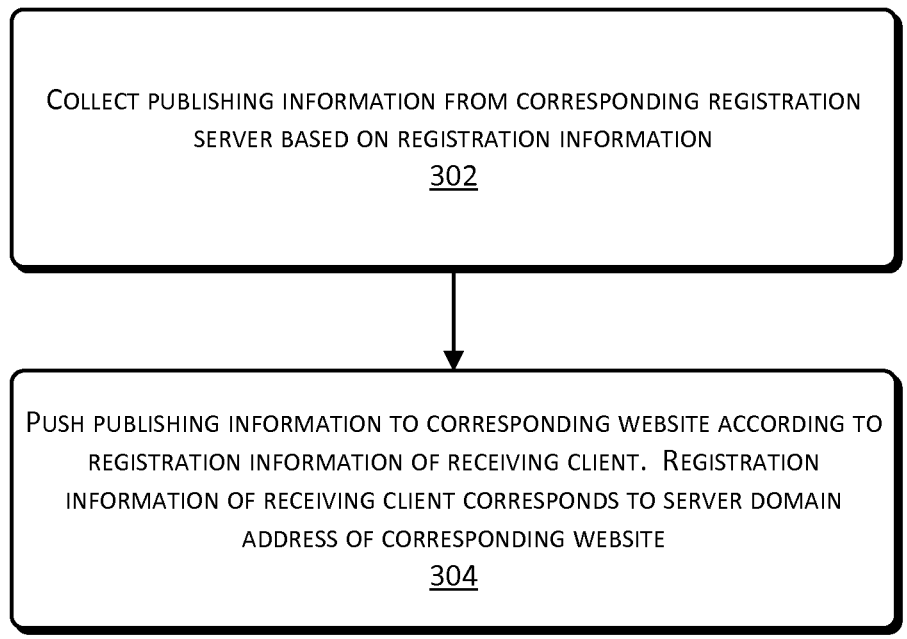
FIG. 3 is a flow chart of an example method for publishing information to the websites in accordance with an example embodiment of the present disclosure

FIG. 3 is a flow chart of an example method for publishing information to websites in accordance with another example embodiment of the present disclosure. As shown in FIG. 3, the example method may include the following operations.

At 302, through the collecting server in FIG. 1, the publishing information is collected from the corresponding registration server based on registration information. The publishing information may include the receiving terminal registration information.

At 304, through the pushing server in FIG. 1, the publishing information is pushed to the corresponding website based on the receiving terminal registration information. The receiving terminal registration information is identical or corresponds to the server domain name address of the corresponding website.

The solution of the above example embodiments of the present disclosure provides a way to distribute information to websites without logging into the websites. The user only needs to download the publishing information from a registration server through a collecting server and then have a pushing server determine the target websites that distribute the information by reading the registration information, thereby making it possible to push publishing information directly to the websites that correspond to the server domain name address of the receiving client and completing publishing of messages. The user does not need to separately log into each website to complete the process of publishing information. This resolves the issues of the highly excessive and inefficient process of publishing information at websites provided by the relevant existing technology. The present techniques achieve a reduction of the steps for publishing information at websites. Also, due to the fact that there may be a plurality of registration servers, a plurality of publishing messages may be downloaded. That is, it is possible to send information to a plurality of websites, thereby achieving a reduction of redundant steps for publishing information and an improvement of the efficiency of publishing information.

Specifically, the registration server in the above example embodiments of the present disclosure can be an e-mail server, an instant communication tool or application server, and a cell phone text message server, etc., or any other server that exchanges information through a network.

For example, when the registration server is an instant communications application server, an account number of a registered user for a current user may be used as the registration information. The user uses the instant communication tool on the client to distribute messages to one or a plurality of users (log-in account numbers or user names). All messages will be saved on the instant communication tool server. Based on the log-in account number or user name of the registered user, the collecting server will download the message sent by the registered user from the instant communication tool server. The message includes the log-in account number that uses the instant communication tool to distribute a message, the log-in account number of the message recipient and contents of the message. Then, the pushing server will distribute the message to the target websites based on the user information of another or a plurality of users (the log-in account numbers or user names of the message recipients). At this time, the login account numbers or user names of the message recipients correspond to the server domain name address of the target websites.

When the registration server is a cell phone text message server, the cell phone number registered by the current user may be used as the registration information. When the current user uses a cell phone to send a message to the cell phones of another user or a plurality of users, all messages will be saved on the cell phone text message server. The collecting server will download all the messages sent by the current cell phone user from the cell phone text message server based on the cell phone number of the current user. Such messages include the cell phone number of the message sender (the user that uses the registered cell phone number to send the message), the cell phone numbers of the message recipients as well as the contents of the message. Then, the pushing server will distribute the information to the target websites based on the cell phone numbers of another or the plurality of users (the cell phone numbers of the message recipients). At this time, the cell phone numbers of the message recipients correspond to the server domain names of the target websites.

More specifically, the present disclosure may describe the technical solution in detail by using the example that the registration server is the e-mail server. When the registration information is the e-mail information for registered e-mail addresses, the operations in the above example embodiment include collecting the publishing information from the corresponding registration server based on the registration information. The publishing information includes the receiving terminal registration information. Based on the receiving terminal registration information, the operations for pushing the publishing information to the corresponding websites may include the following.

At a first step, based on the e-mail address information of the registered e-mail addresses, the e-mails from the corresponding e-mail server are downloaded in order to obtain the e-mail information of the e-mails at the registered e-mail addresses. The e-mail information may include the e-mail abstract information.

At a second step, the user names of the e-mail addresses of the recipients in the e-mail abstract information are obtained.

At a third step, based on the user names of the e-mail addresses of the recipients, the e-mail information is pushed to the corresponding websites. The user names of e-mail addresses of the recipients are identical or correspond to the server domain names of the websites corresponding to such registered e-mail addresses.

The above steps may be independently completed by the collecting server 102, or be completed by using a combination of the collecting server 102 and the pushing server 104 as shown in FIG. 1 and FIG. 2. The specific implementations may be determined based on the status of the networks and servers.

The solution in the above example embodiments of the present disclosure provides a way to send information to websites by e-mail. The user only needs to download an e-mail from a registered e-mail address through the collecting server and then extracts the website address of the target website from the e-mail information of the e-mail downloaded through the pushing server, thereby sending contents of the information to the target website. The contents of the information are distributed to the websites corresponding to such registered e-mail addresses in the form of e-mail messages. The above method to send information does not require the user to log into a website. Instead, it pushes contents of the information to the target websites in the form of the e-mail messages and the user may send the e-mail at the same time to the e-mail addresses of a plurality of recipients based on his need and the e-mail addresses of each of the recipients corresponding to a target website. The present techniques achieve operations of sending information to a plurality of websites, thereby achieving operations of sending information at the same time to a plurality of websites and resolving the issue of the highly excessive and inefficient process used by the conventional techniques for publishing information to websites. Further, the present techniques achieve a reduction of the steps for publishing information on websites and improve the efficiency of publishing information.

Take the achievement of the above steps by the collecting server 102 as an example. In the above example embodiments of the present disclosure, the e-mail addresses are firstly registered on the collecting server 102. After completion of configuration of registered e-mail addresses of the collecting server 102, all e-mails of registered e-mail addresses are downloaded from the corresponding e-mail server.

Specifically, during an example process of the present disclosure, the e-mail address registered at the collecting server can be the e-mail address of the sender or the e-mail address of the recipient. If the registered e-mail address is the e-mail address of the sender, the collecting server will, based on the e-mail information of the e-mail address of the sender that has been locally configured, obtain all the e-mails and e-mail information from the outbox of the e-mail address of the sender. The e-mail information may include the e-mail abstract information. The e-mail abstract information records the e-mail addresses of the recipients of all e-mails. At this time, the pushing server will push the e-mail information based on the user names of the e-mail addresses of the recipients. The user names of the e-mail addresses of such recipients correspond to the server domain name addresses of the target websites to which the e-mail information needs to be pushed.

Similarly, if the registered e-mail addresses are the e-mail addresses of the recipients, then the collecting server will, based on the e-mail address information of the e-mail addresses of such recipients that has been locally configured, obtain all e-mails and e-mail information from the inboxes of the e-mail addresses of the recipients. E-mail information may include the e-mail abstract information. The e-mail abstract information records the e-mail addresses of the recipients of all e-mails. At this time, the pushing server will, based on the user names of the e-mail addresses of the recipients, push the e-mail information. The user names of the e-mail addresses of such recipients correspond to the server domain name addresses of the target websites to which the e-mail information needs to be pushed. In the above two examples, there may be a plurality of e-mail addresses of recipients.

In the above example embodiment, the collecting server 102 as shown in FIGS. 1 and 2 may implement the above operations. For example, using the example that the registered e-mail address is the e-mail address of the sender, the collecting server configures the e-mail address information of the e-mail address of the sender in the format defined by Table 1. The collecting server will log into the e-mail address of the sender based on the configured e-mail address information and download all of the e-mails and e-mail information in the sent box, which includes all sent e-mails, of the e-mail address of the sender. During the example process, the collecting server will use the defined user name and password of the e-mail address of the sender (such as fatie@XXX.com) to log into the e-mail server and then at preset intervals (such as 5 minutes) inquire and download all of the e-mails at the registered e-mail address from the e-mail server.

The collecting server may define forwarding rules based on Table 2 as above. Table 2 defines the relationship between e-mail addresses and the websites corresponding to such e-mail addresses. That is, the e-mail address represents the target website to which information is published. Again, using the example that the registered e-mail address is the e-mail address of the sender, the user may at the same time send an e-mail to the e-mail addresses of one or a plurality of recipients through the e-mail address of the sender. For example, sending an e-mail to a@XXX.com from the registered e-mail address may represent that the user needs to send a post at website a according to the relationship table in Table 2. Since the user can at the same time send an e-mail to the e-mail addresses of a plurality of recipients through the e-mail address of one sender, the e-mail address of the sender has a many-to-many corresponding relationships with the target websites to which the information needs to be posted. The e-mail address of one recipient corresponds to the address of one target website.

After the collecting server downloads the e-mails periodically or in real time through configuring the e-mail address information of the registered e-mail addresses, it may save the e-mail information of all e-mails locally on the collecting server. The pushing server obtains e-mail information from the collecting server and, based on the mapping rules between the e-mail addresses of the recipients in the e-mail information and the websites, pushes the e-mail information to the corresponding target websites. Alternatively, the e-mail information may also be categorized and saved on other servers. The pushing server reads the e-mail information from the other servers and pushes the e-mail information to the corresponding websites based on the mapping rules between the e-mail addresses of the recipients in the e-mail information and the websites.

In the above example embodiments of the present disclosure, the e-mail information may also include the e-mail body text and the e-mail attachments. After e-mail information of all e-mails at the registered e-mail address is obtained, an example method may further include the following. A unique identification (ID) of each e-mail is obtained. A relationship between the ID and the e-mail information corresponding to such ID is created to obtain a relationship table. Example operations for creating the relationship between the ID and the e-mail address to obtain the relationship table may include the following. A relationship between the ID and the e-mail abstract information corresponding to such ID is created in order to obtain a first relationship table. In addition or alternatively, a relationship between the ID and the e-mail body text and the e-mail attachment in the e-mail information is created in order to obtain a second relationship table. Further, after creating the relationship between the ID and the e-mail information corresponding to such ID in order to obtain the relationship tables, the example method may include the following. The relationship tables are saved to one or more server. The one or more servers may include the database server and/or the file server. A triggering message is sent to the pushing server. The pushing server reads the relationship table saved on the servers based on the received triggering message.

After the collecting server receives e-mails in the example embodiment, the first relationship table may be saved in the database system. The push server obtains the corresponding e-mail abstract information from such database server. The second relationship table may be saved in the file server. The pushing server may obtain the corresponding e-mail attachment and e-mail body text from the file server.

For example, after the collecting server in the above example embodiment downloads and obtains all e-mails, it can obtain the unique ID of each e-mail based on any or a combination of any two or more of the following parameters according to one or more preset rules. The parameters may include the machine serial number/ IP address of the collecting server, the sending time of the e-mail, and the random serial number. The ID may be a unique 32-bit ID.

For example, as shown in Table 3 above, the e-mail abstract information saved on the database server may include the e-mail title, the e-mail address of the sender, the e-mail address of the recipient, and the sending time. The ID may be used as the unique identifier to create a corresponding relationship with the e-mail abstract information. In addition, the e-mail body text and e-mail attachments of each e-mail may be saved on the file server in the form of a folder. The folder may be named after the unique ID of each e-mail. Thus, the corresponding relationship between the ID and the e-mail body text and the e-mail attachment of e-mail information is obtain and saved on the file server.

In the above example embodiment, the e-mail abstract information may include the e-mail title, the e-mail address of the sender, the e-mail address of the recipient, and a sending time. Example operations for pushing the e-mail information to the website corresponding to the registered e-mail address based on the user name of the e-mail address of the recipients may include the following. The e-mail abstract information in the first relationship table is read. The website to be accessed is determined based on the user name of the e-mail addresses of the recipient in the e-mail abstract information. The user name corresponds to the server domain name address of the website. It is determined whether properties of the e-mail abstract information in the first relationship table match properties of a first data processing interface provided by the website. If there is a match, the e-mail abstract information of the e-mail information is sent to the website through the first data processing interface. When the e-mail abstract information of the e-mail information is sent successfully, the ID corresponding to such e-mail abstract information returned by the website is received. If there is no match, the pushing of the e-mail abstract information of the e-mail information is terminated.

Further, before pushing the e-mail abstract information of the e-mail information to the websites through the first data processing interface, the example method may include the following. Registered user information table of the website is inquired to determine whether the registered user corresponding to the e-mail address of the recipient in the e-mail information exists. When the inquiry is successful, the e-mail abstract information of the e-mail information is permitted for pushing. When the inquiry fails, the pushing of the e-mail abstract information of the e-mail information is terminated.

In the above example embodiment, the collecting server or the pushing server connected to the collecting server will determine the server domain names of the target websites based on the user names of the e-mail addresses of the recipients in the e-mail information. Such process may be an inquiry process. The collecting server or the pushing server connected to the collecting server has already preset the forwarding rules as defined in Table 2. The user names in the e-mail addresses of the recipients are identical or correspond to the server domain name addresses of the target websites to be accessed.

After determining the target websites for sending the post or the publishing information, the collecting server or the pushing server connected to the collecting server may match various properties in the e-mail abstract information with the first data processing interface (article publishing interface) that has been provided with the target websites to push the e-mail abstract information. In case of a successful match, the e-mail abstract information can be pushed to the websites through such interface. For example, prior to the pushing, it may firstly determine whether the e-mail address of the sender carried in the e-mail abstract information has been registered on the target website. That is, the website inquires whether the registered user corresponding to the e-mail address is registered through "the e-mail address of the sender." If there is already a registration, the login information of the registered user corresponding to the e-mail address of the sender is obtained and the login information of the registered user is used to perform follow-up operations for sending the post. That is, the registered user is used to post the e-mail information pushed by the pushing server. Otherwise, no operations are performed. If the transmission is successful, the target website will return the ID of the article through the first data processing interface. That is, it returns the ID corresponding to the e-mail abstract information to download the corresponding e-mail body text and attachment.

Further, after receiving the ID corresponding to such e-mail abstract information that has been returned by the website, the example method may include the following. Based on the returned ID, the e-mail body text and the e-mail attachment corresponding to such ID is read from the second relationship table. It is determined whether properties of the e-mail body text and the e-mail attachment in the second relationship table match properties of the second data processing interface provided by the website. If there is match, the e-mail body text and the e-mail attachment corresponding to the ID are sent to the websites through the second data processing interface. If there is no match, there is a failure to send the e-mail body text and the e-mail attachment and an error message is returned.

In the above example embodiment of the present disclosure, after the e-mail abstract information is successfully published on the target website, that is, the information such as the e-mail title, the e-mail address of the sender, the e-mail address of the recipient and the sending time, etc. is published at the website based on the need of the user, the collecting server or the pushing server connected to the collecting server will determine the e-mail body text and/or the e-mail attachment corresponding to such e-mail abstract information based on ID corresponding to the successfully sent e-mail abstract information returned by the website.

For example, the collecting server or the pushing server connected to the collecting server may push the e-mail body text and/or the e-mail attachment corresponding to the e-mail abstract information based on the second data processing interface provided by the websites. The second data processing interface provided by the website is an attachment transmission interface used for pushing e-mail body text and/or the e-mail attachment. For example, various properties of the e-mail body text and the e-mail attachment may be matched with the attachments transmission interface that is provided by the target website and is used for pushing e-mail body text and/or the e-mail attachment. In case of a successful match, the pushing server reads the e-mail body text and the e-mail attachment corresponding to such ID from the file server and pushes them to the target website through the second data processing interface. If the transmission is successful, the interface returns a message indicating success such as true. If the transaction is a failure, the interface returns an error message.

For example, in the above example embodiments of the present disclosure, if the e-mail body text collected by the collecting server from the e-mail server contains pictures, the pushing server will first modify the path format of the pictures in the e-mail body text. For instance, an absolute path of the website may be used as the basis for such modification in order to obtain the new path format of such picture. For example, a path format of a picture "User.jpg" is changed to http://blog.alibaba.com/12593121212/user.jpg, wherein http://blog.alibaba.com/ may be the absolute address of the target website and the number "12593121212" may be the unique ID number of the e-mail body text. Then, the new path format of the picture is used to identify the picture. Finally, the newly identified picture is pushed as an e-mail attachment. That is, the e-mail attachment pushed by the pushing server includes the picture within the e-mail body text and the conventional attachment. At the same time, after the pushing server pushes the e-mail attachment to one or more websites, such websites will verify conventional attachment in the e-mail attachment as well as the picture in the e-mail body text.

The steps shown in the flow chart of the FIGs may be executed by a computing system including one or more processors configured with computer-executable instructions. For example, each of the file server, collecting server, database server, pushing sever as described herein may include one or more processors configured with computer-executable instructions stored on one or more memories to perform their corresponding functionalities. In addition, although the flow charts in the FIGs show some logical sequences, in some circumstances, the operations shown or described herein may be executed in a different sequence as shown in the FIGs or described herein.

Figure 4:
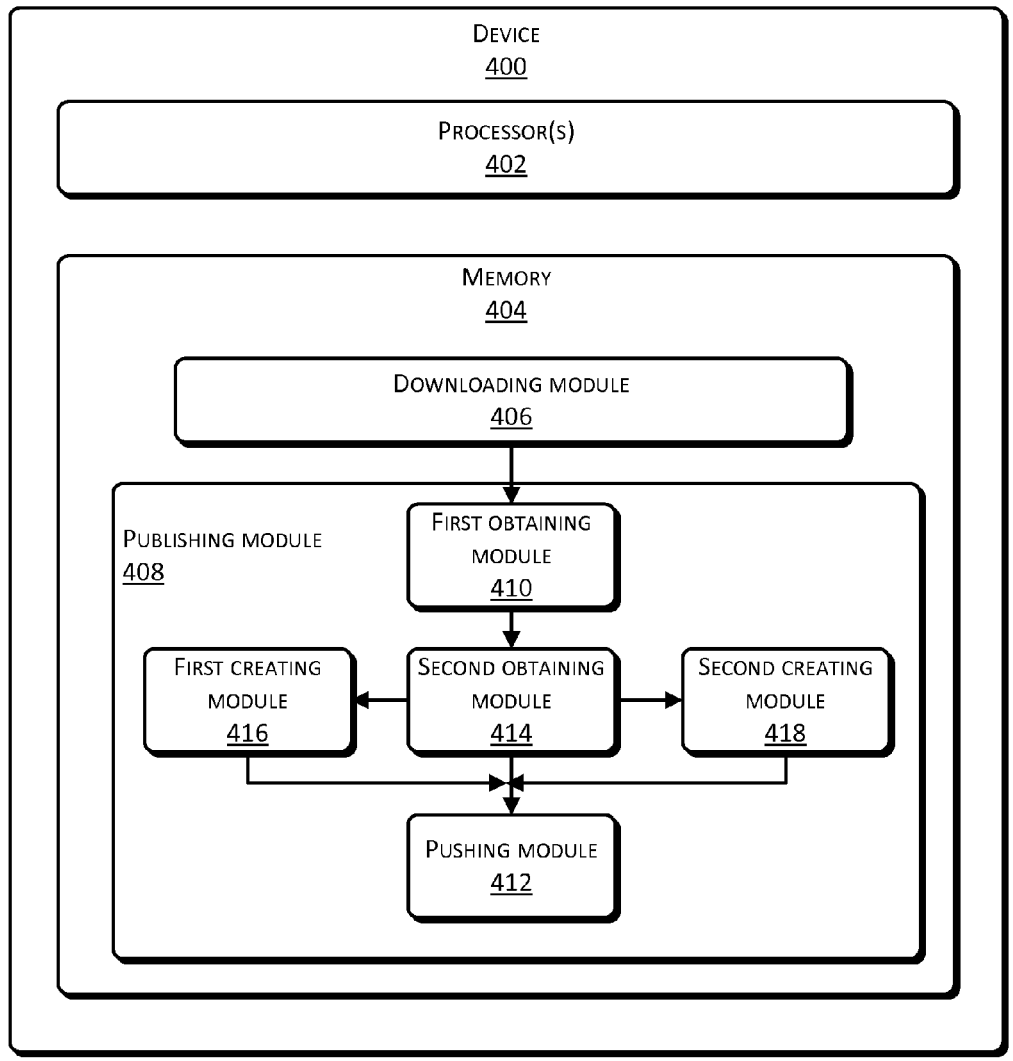
FIG. 4 is a structural diagram of an example apparatus for publishing information to the websites in accordance with an example embodiment of the present disclosure

FIG. 4 illustrates a structural diagram of an example device 400 for publishing information to websites according to another example embodiment of the present disclosure. The example device 400 may include one or more processor(s) 402 and memory 404. The memory 404 is an example of computer-readable media. As used herein, "computer-readable media" includes computer storage media and communication media.

Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 404 may store therein program units or modules and program data.

In the example of FIG. 4, the memory 404 may store therein a downloading module 406 and a publishing module 408. The downloading module 406 collects publishing information from a corresponding registration server based on registration information. The publishing information may include registration information of a receiving client. The publishing module 408 establishes a communication with the downloading module and sends the publishing information to a corresponding website according to the receiving terminal registration information. The receiving terminal registration information corresponds to a server domain address of the corresponding website.

The solution of the above embodiments of the present disclosure provides a way to distribute information to websites without logging into the websites. The user only needs to download the publishing information from a registration server through a collecting server and then have a pushing server determine the target websites that distribute the information by reading the registration information, thereby making it possible to push publishing information directly to the website that correspond to the server domain name address of the receiving client and completing publishing of messages. The user does not need to separately log into each website to complete the process of publishing information. This resolves the issues of the highly excessive and inefficient process of publishing information at websites provided by the relevant existing technology. The present techniques achieve a reduction of the steps for publishing information at websites. Also, due to the fact that there may be a plurality of registration servers, a plurality of publishing messages may be downloaded. That is, it is possible to send information to a plurality of websites, thereby achieving a reduction of redundant steps for publishing information and an improvement of the efficiency of publishing information.

Specifically, the registration server in the above embodiments of the present disclosure can be an e-mail server, an instant communication tool or application server, and a cell phone text message server, etc., or any other server that exchanges information through a network.

For example, the present disclosure may describe the present techniques in details by using the e-mail server as the registration server. When registration information is the e-mail information of a registered e-mail address, the downloading module 406 in the above example embodiment downloads e-mails from the corresponding e-mail server based on the e-mail information at the registered e-mail addresses in order to obtain the e-mail information of the e-mails. The e-mail information may include the e-mail abstract information. The publishing module 408 may include a first obtaining module 410 and a pushing module 412. The first obtaining module 410 sets up connection with the publishing module 408 to obtain the user names of the e-mail addresses of the recipients in the e-mail abstract information. The pushing module 412 sets up connection with the first obtaining module 408 to push e-mail information to the corresponding websites based on the user names of the e-mail addresses of the recipients. The user names of the e-mail addresses of the recipients are identical or correspond to the server domain name addresses corresponding to the websites of such a registered e-mail addresses.

The solution in the above example embodiments of the present disclosure provides a way to send information to websites by e-mail. The user only needs to download an e-mail from a registered e-mail address through the collecting server and then extracts the website address of the target website from the e-mail information of the e-mail downloaded through the pushing server, thereby sending contents of the information to the target website. The contents of the information are distributed to the websites corresponding to such registered e-mail addresses in the form of e-mail messages. The above method to send information does not require the user to log into a website. Instead, it pushes contents of the information to the target websites in the form of the e-mail messages and the user may send the e-mail at the same time to the e-mail addresses of a plurality of recipients based on his need and the e-mail addresses of each of the recipients corresponding to a target website. The present techniques achieve operations of sending information to a plurality of websites, thereby achieving operations of sending information at the same time to a plurality of websites and resolving the issue of the highly excessive and inefficient process used by the conventional techniques for publishing information to websites. Further, the present techniques achieve a reduction of the steps for publishing information on websites and improve the efficiency of publishing information.

The e-mail information in the above example embodiment of the present disclosure may also include the e-mail body text and the e-mail attachment. The publishing module 408 may further include a second obtaining module 414, a first creating module 416, and/or a second creating module 418.

The second obtaining module 414 obtains a unique ID of each e-mail. The ID may include any one of or a combination of any two or more of multiple parameters according to one or more preset rules. The parameters may include a serial number of a client device, an e-mail time, and a random serial number. The first creating module 416 establishes a communication with the second obtaining module 414 to create a relationship between the ID and the e-mail abstract information corresponding to such ID to obtain a relationship table.

The second creating module 418 establishes a communication with the second obtaining module 414 to create a relationship between the ID and the e-mail body text and the e-mail attachment in the e-mail information to obtain a second relationship table.

Further, the e-mail abstract information may include an e-mail title, an e-mail address of a sender, the e-mail address of the recipient, and a sending time. The pushing module 412 may further include a first reading module, a verifying module, and a first determining module. The first reading module reads the e-mail abstract information in the first relationship table. The verifying module determines the website to be accessed based on the user name of the e-mail addresses of the recipient in the e-mail abstract information. The user name corresponds to the server domain name address of the website. The first determining module determines whether properties of the e-mail abstract information in the first relationship table match properties of a first data processing interface provided by the website. If there is a match, the e-mail abstract information of the e-mail information is sent to the website through the first data processing interface. When the e-mail abstract information of the e-mail information is sent successfully, the ID corresponding to such e-mail abstract information returned by the website is received. If there is no match, the pushing of the e-mail abstract information of the e-mail information is terminated.

Further, the pushing module 412 may include a second reading module and a second determining module. The second reading module, based on the returned ID, reads the e-mail body text and the e-mail attachment corresponding to such ID from the second relationship table. The second determining module determines whether properties of the e-mail body text and the e-mail attachment in the second relationship table match properties of the second data processing interface provided by the website. If there is match, the e-mail body text and the e-mail attachment corresponding to the ID are sent to the websites through the second data processing interface. If there is no match, there is a failure to send the e-mail body text and the e-mail attachment and an error message is returned.

From the above description, the present techniques provides at least following technical effects. The present disclosure provides a function to automatically forward an e-mail sent by a user to various websites to generate an article and comment at each website. At the same time, even if the website server crashes, the present techniques save the e-mail sent by the user to a server for selection. After it is determined that the website server has been restored, the present techniques push the article to the corresponding websites. In addition, the present techniques permit configuration of many-to-many relationships between the e-mail addresses of recipients and the websites. The user may send the e-mail to an e-mail addresses that have been configured with the sent boxes with the plurality of websites. Thus, the pushing sever sends the e-mail to the plurality of websites.

One of ordinary skill in the art would understand that the example apparatuses, modules, and devices as described herein may be performed by a general-purpose computing device. The apparatuses, modules, and devices may be integrated at a single computing device or distributed among a network including multiple computing devices. Alternatively, operations or steps as described in the present disclosure may be performed by the one or more computing devices configured with computer-executable instructions, which may be stored in the memories to be executed by the computing devices. Alternatively, such computer-executable instructions may be built into various circuits. Some or all of the computer-executable instructions may also be built into one circuit. Thus, the present techniques may be implemented in a form of hardware, software, or a combination thereof. The present disclosure does not limit any such combination.

The above descriptions illustrate example embodiments of the present disclosure. The embodiments are merely for illustrating the example embodiments and are not intended to limit the scope of the present disclosure. It should be understood by one of ordinary skill in the art that certain modifications, replacements, and improvements can be made and should still be considered under the protection of the present disclosure without departing from the principles of the present disclosure.

What is claimed is:

1. A method comprising:
    collecting publishing information from a registration server based on registration information, the publishing information including receiving terminal registration information, where:
        the terminal registration information is transmitted from the registration server to a collecting server comprising one or more processors and a memory device that stores the terminal registration information and is communicatively coupled with the one or more processors, and
        the collecting the publishing information from the registration server comprises downloading one or more e-mails from a corresponding e-mail server to obtain e-mail information of the e-mails;
    creating a unique identification (ID) for each e-mail, after obtaining the e-mail information of the e-mails, the unique ID including one or more of the following parameters:
        a machine serial number of the collecting server,
        a serial number of a client terminal, or
        a random serial number; and
    pushing the publishing information to one or more corresponding websites according to the receiving terminal registration information.

2. The method as recited in claim 1, wherein the receiving terminal registration information corresponds to a domain name address of the one or more corresponding websites.

3. The method as recited in claim 1, wherein:
    the registration information includes e-mail address information of a registered e-mail address;
    the e-mail information including e-mail abstract information; and
    the pushing the publishing information to the one or more corresponding websites according to the receiving terminal registration information comprises:
        obtaining a user name of an e-mail address of a recipient from the e-mail abstract information; and
        pushing the e-mail information to the corresponding website according to the user name of the e-mail address of the recipient.

4. The method as recited in claim 3, wherein:
    the e-mail information further includes an e-mail body text or an e-mail attachment; and
    after obtaining the e-mail information of the e-mails, the method further comprises:
        establishing a corresponding relationship between a respective ID and respective email information corresponding to the respective ID to obtain a relationship table.

5. The method as recited in claim 4, wherein the establishing the corresponding relationship between the respective ID and respective e-mail information corresponding to the respective ID to obtain the relationship table comprises:
    establishing a corresponding relationship between the respective ID and respective e-mail abstract information corresponding to the respective ID to obtain a first relationship table.

6. The method as recited in claim 5, wherein establishing the corresponding relationship between the respective ID and respective e-mail information corresponding to the respective ID to obtain the relationship table further comprises:
    establishing a corresponding relationship between the respective ID and respective e-mail body text or respective e-mail attachment corresponding to the respective ID to obtain a second relationship table.

7. The method as recited in claim 5, wherein:
    the e-mail abstract information includes:
        an e-mail title;
        an e-mail address of a sender;
        an e-mail address of a recipient; and
        a sending time; and
    the pushing the publishing information to the one or more corresponding websites according to the receiving terminal registration information comprises:
        reading the e-mail abstract information from the first relationship table;
        determining the one or more corresponding websites to be accessed based on the e-mail address of the recipient;
        determining whether a property of the e-mail abstract information in the first relationship table matches a property of a first data processing interface provided by the one or more corresponding websites;
        in response to determining that there is a match,
            sending the e-mail abstract information to the one or more corresponding websites through the first data processing interface; and
            obtaining an ID corresponding to the e-mail abstract information; and
        in response to determining that there is not a match, terminating sending the e-mail abstract information.

8. The method as recited in claim 7, further comprising:
    prior to sending the e-mail abstract information to the one or more corresponding websites through the first data processing interface,
        inquiring the one or more corresponding websites to determine whether there is a registered user at the one or more corresponding websites that corresponds to the e-mail address of the recipient;
        in response to determining that there is the registered user, permitting to send the e-mail abstract information; and
        in response to determining that there is not the registered user, terminating sending the e-mail abstract information.

9. The method as recited in claim 7, further comprising:
    after obtaining the ID corresponding to the e-mail abstract information,
        reading a respective e-mail body text or a respective e-mail attachment corresponding to the obtained ID;
        determining whether a property of the respective e-mail body text or the respective e-mail attachment in the second relationship table matches a property of a second data processing interface provided by the corresponding website;
        in response to determining that there is a match, sending the respective e-mail body text or the e-mail attachment to the corresponding website through the second data processing interface; and in response to determining that there is not a match, withholding sending the respective e-mail body text or the e-mail attachment.

10. The method as recited in claim 5, further comprising:
after the establishing the corresponding relationship between the respective ID and respective e-mail information corresponding to the respective ID to obtain the relationship table,
storing the relationship table to a server, the server including a database server or a file server; and
sending a triggering message to a pushing server to read the stored relationship table from the server.

11. The method as recited in claim 1, wherein the unique ID further includes
an e-mail time.

12. A system comprising:
one or more processors;
a memory device communicatively coupled with the one or more processors;
a collecting server having instructions executable by the one or more processors for:
  collecting publishing information from a registration server based on registration information, where:
    the publishing information includes receiving terminal registration information, and
  downloading one or more e-mails from a corresponding e-mail server to obtain e-mail information of the e-mails,
  obtaining a unique identification (ID) for each e-mail, the unique ID including one or more of the following parameters:
    a machine serial number of the collecting server,
    a serial number of a client terminal, or
    a random serial number; and
a pushing server having instructions executable by the one or more processor for pushing the publishing information to one or more corresponding websites according to the receiving terminal registration information.

13. The system as recited in claim 12, wherein:
the registration information includes e-mail address information of a registered e-mail address;
the e-mail information including e-mail abstract information; and
the pushing server that obtains a user name of an e-mail address of a recipient from the e-mail abstract information and pushes the e-mail information to the one or more corresponding websites according to the user name of the e-mail address of the recipient.

14. The system as recited in claim 12, wherein:
the e-mail information further includes an e-mail body text or an e-mail attachment; and
the collecting server further:
  establishes a corresponding relationship between the respective ID and respective e-mail abstract information corresponding to the respective ID to obtain a first relationship table; and
  establishes a corresponding relationship between the respective ID and respective e-mail body text or respective e-mail attachment corresponding to the respective ID to obtain a second relationship table.

15. The system as recited in claim 14, further comprising:
a database server that establishes a communication with the collection server and stores the first relationship table; and
a file server that establishes another communication with the collection server and stores the second relationship table.

16. The system as recited in claim 15, wherein:
the e-mail abstract information includes:
  an e-mail title;
  an e-mail address of a sender;
  an e-mail address of a recipient; and
  a sending time; and
the pushing server includes:
  a first reading apparatus that establishes a communication with the database server and reads the e-mail abstract information in the first relationship table from the database server;
  a processing apparatus determines the one or more corresponding websites to be accessed based on the user name of the e-mail addresses of the recipient; and
  a first determining apparatus that:
    determines whether a property of the e-mail abstract information in the first relationship table matches a property of a first data processing interface provided by the one or more corresponding websites;
    in response to determining that there is a match,
      sends the e-mail abstract information to the one or more corresponding websites through the first data processing interface; and
      obtains an ID corresponding to the e-mail abstract information; and
    in response to determining that there is not a match,
      terminates sending the e-mail abstract information.

17. The system as recited in claim 15, wherein the pushing server further comprises:
a receiving apparatus for receiving the ID; and
a second reading apparatus for:
  reading, based on the ID, an e-mail body text or an e-mail attachment corresponding to the ID from the second relationship table;
  determining whether a property of the respective e-mail body text or the respective e-mail attachment in the second relationship table matches a property of a second data processing interface provided by the one or more corresponding websites;
  in response to determining that there is a match, sending the respective e-mail body text or the e-mail attachment to the one or more corresponding websites through the second data processing interface; and
  in response to determining that there is not a match, withholds sending the respective e-mail body text or the e-mail attachment.

18. A device comprising:
one or more processors;
a memory device communicatively coupled with the one or more processors;
a downloading module having instructions executable by the one or more processors for collecting publishing information from a registration server based on registration information, the publishing information including receiving terminal registration information, where:
  the downloading module downloads one or more e-mails from a corresponding e-mail server to obtain e-mail information of the e-mails,
a first obtaining module having instructions executable by the one or more processors for obtaining a user name of an e-mail address of a recipient from the e-mail abstract information;
a second obtaining module having instructions executable by the one or more processors for obtaining a unique ID of each e-mail;
a first creating module having instructions executable by the one or more processors for establishing a communication with the second obtaining module to create a relationship between the ID and the e-mail abstract information corresponding to such ID to obtain a first relationship table wherein the unique ID includes one or more of the following parameters:
a machine serial number of the collecting server,
a serial number of a client terminal, or
a random serial number; and
a publishing module having instructions executable by the one or more processors for establishing a communication with the downloading module and sends the publishing information to one or more corresponding websites according to the receiving terminal registration information.

19. The device as recited in claim 18, wherein:
the registration information includes e-mail address information of a registered e-mail address; and
the e-mail information including e-mail abstract information; and
the publishing module, having instructions executable by the one or more processors, further includes:
a pushing module having instructions executable by the one or more processors for pushing the e-mail information to the one or more corresponding websites according to the user name of the e-mail address of the recipient.

20. The device as recited in claim 19, wherein:
the e-mail information further includes an e-mail body text or an e-mail attachment; and
the device further includes:
a second creating module that establishes a communication with the second obtaining module to create a relationship between the ID and the e-mail body text or the e-mail attachment in the e-mail information to obtain a second relationship table.

* * * * *